United States Patent

[11] 3,598,196

| [72] | Inventors | Thomas J. Ballantyne<br>Jenkintown;<br>Bernard W. Jalbert, Fallsington, both of, Pa. |
|---|---|---|
| [21] | Appl. No. | 827,383 |
| [22] | Filed | May 23, 1969 |
| [45] | Patented | Aug. 10, 1971 |
| [73] | Assignee | Eaton Yale & Towne Inc.<br>Cleveland, Ohio |

[54] STEERING MECHANISM
13 Claims, 6 Drawing Figs.

[52] U.S. Cl. ................................................ 180/79.1,
180/98
[51] Int. Cl. .................................................. B62d 5/04
[50] Field of Search ................................... 180/79.1,
79, 98, 77

[56] References Cited
UNITED STATES PATENTS

| 2,331,144 | 10/1943 | Sitter | 180/79.1 |
| 2,820,872 | 1/1958 | Carr | 180/79.1 X |
| 2,847,080 | 8/1958 | Zworykin | 180/79.1 X |
| 2,877,656 | 3/1959 | Orr | 180/79.1 X |
| 2,996,621 | 8/1961 | Barrett | 180/79.1 X |
| 3,009,525 | 11/1961 | De Liban | 180/79.1 X |
| 3,039,554 | 6/1962 | Hosking et al. | 180/77 |

*Primary Examiner*—Leo Friaglia
*Assistant Examiner*—John A. Pekar
*Attorney*—Yount and Tarolli ABSTRACT: A vehicle-steering mechanism operates to cause a vehicle to follow a current-carrying wire. The steering mechanism includes a driven member and a pair of electromagnetic clutches having output members drivingly connected with the driven member for applying oppositely directed driving forces thereto. These driving forces are substantially equal when the vehicle is properly positioned relative to the current-carrying wire. Sensor means senses deviation of the vehicle from the wire and through a control circuit operates to control the clutches to change the driving torque applied to the driven member. As a result, the driven member is rotated to effect movement of a wheel for vehicle steering purposes.

PATENTED AUG 10 1971 3,598,196

INVENTORS
THOMAS J. BALLANTYNE
BERNARD W. JALBERT

BY *Young and Tarolli*

ATTORNEYS

INVENTORS
THOMAS J. BALLANTYNE
BERNARD W. JALBERT
BY Yount and Tarolli
ATTORNEYS

STEERING MECHANISM

The present invention relates to a steering mechanism for a vehicle, and particularly relates to a steering mechanism for causing a vehicle to follow a current-carrying wire.

Steering mechanisms for automatically controlling the movement of a vehicle so that the vehicle follows a current carrying wire are known. No known steering mechanism, however, utilizes a pair of clutches of the electromagnetic type to drive a steering member for steering purposes and the outputs of which oppose each other and are controlled to effect a driving of the member for vehicle steering. Such a steering mechanism provides for extremely accurate and rapid response of the steering mechanism to sensing of the fact that the vehicle is not properly following the current-carrying wire.

Accordingly, the principal object of the present invention is the provision of a new and improved steering mechanism for a vehicle which is to follow a current-carrying wire and wherein the steering is effected by a pair of electromagnetic clutches which are driven in an opposing relation so that a steering error signal applied thereto varies the energization of the electromagnetic clutches and causes the clutches to provide a drive for effecting steering of the vehicle.

A further object of the present invention is the provision of a new and improved steering mechanism for a vehicle which is to follow a current-carrying wire and wherein the electromagnetic clutches have outputs which drivingly oppose each other and the output torques of the clutches are equal when the vehicle is properly positioned relative to the wire.

A still further object of the present invention is the provision of a new and improved steering mechanism for a vehicle which is to follow a current-carrying wire and wherein a deviation sensor senses deviation of the vehicle from the wire and through a control circuit varies the degree of energization of the electromagnetic clutches in such a manner that one clutch is energized to less of an extent and the other to a greater extent.

Another object of the present invention is the provision of a new and improved steering system wherein a speed feedback signal is provided by a tachometer generator which is driven when the steering member is driven, and wherein the tachometer signal is compared with the signal from a steering deviation sensor to provide an output signal for controlling the pair of electromagnetic clutches.

Still another object of the present invention is the provision of a new and improved steering mechanism which includes a pair of opposed electromagnetic clutches and wherein a deviation sensor is incorporated in an electrical circuit for controlling the current flowing in the coils of the electromagnetic clutches, and wherein the current in one of the clutches decreases and the current in the other clutch increases in response to a deviation signal.

Further objects and advantages of the present invention will be apparent to those skilled in the art to which it relates from the following detailed description of a preferred embodiment thereof made with reference to the accompanying drawings in which.

Figure 1:
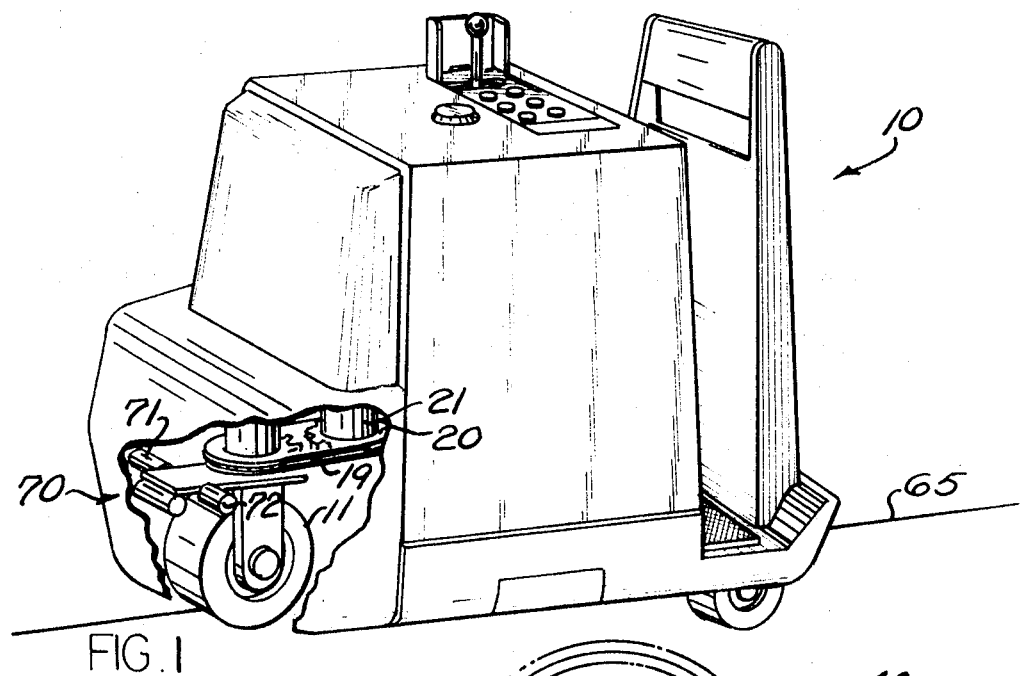
FIG. 1 is a schematic illustration of a vehicle incorporating the present invention.

The present invention provides a new and improved vehicle steering mechanism for causing a vehicle to follow a current-carrying wire. The mechanism may be applied to any type of vehicle, but is particularly advantageously applied to a material handling vehicle, such as a tractor or the like which is adapted to be used in and follow a particular path in a warehouse, or the like. As representative of a preferred embodiment of the present invention, a steering mechanism is shown herein as applied to a material-handling device in the form of a tractor 10.

The tractor 10 includes a suitable drive unit, not shown, for driving suitable wheels of the vehicle to convey the vehicle. The tractor 10 in the illustrated embodiment also includes a third wheel 11 which may be turned about a vertical axis to effect steering of the vehicle 10. The wheel 11 is turned for steering purposes by operation of a steering mechanism, generally designated 12. The steering mechanism 12 is operable to cause the vehicle 10 to follow a current-carrying wire which is laid along the path which the vehicle is to follow.

The steering mechanism 12, as noted above, effects turning movement of the wheel 11 to effect steering of the vehicle 10. The wheel 11 is operatively associated with a driven steering member in the form of a sprocket 20. The driven steering member or sprocket 20 has a drive chain 19 trained therearound. The drive chain 19 is also trained around a support for the steerable wheel 11 so that upon rotation of the sprocket 20, the wheel 11 will be rotated.

The sprocket 20 is drivingly connected with a shaft 21 which, in turn, has a gear 22 thereon and drivingly connected therewith. It should be apparent, of course, that upon rotation of the gear 22, the shaft 21 and sprocket 20 will likewise be rotated. The gear 22 is in meshing engagement with a pinion gear 25. The pinion gear 25 is drivingly connected for rotation with a gear 26. The gear 26 meshes with a corresponding sized gear 27.

The gear 26 also has a meshing engagement with a pinion gear 28 which is drivingly connected on the output shaft 29 of a clutch unit 30. The clutch unit 30 has an input member 31 and an output member 32, the output member 32 being connected with the shaft 29 to effect rotation of the shaft 29 upon energization of the clutch unit 30. The gear 27 is also operatively associated with a clutch, generally designated 40. The clutch 40 has an input member 41 and an output member 42. The output member 42 is drivingly connected with an output shaft 43. The output shaft 43 carries a pinion gear 44' which meshes with the gear 27.

Figure 2:
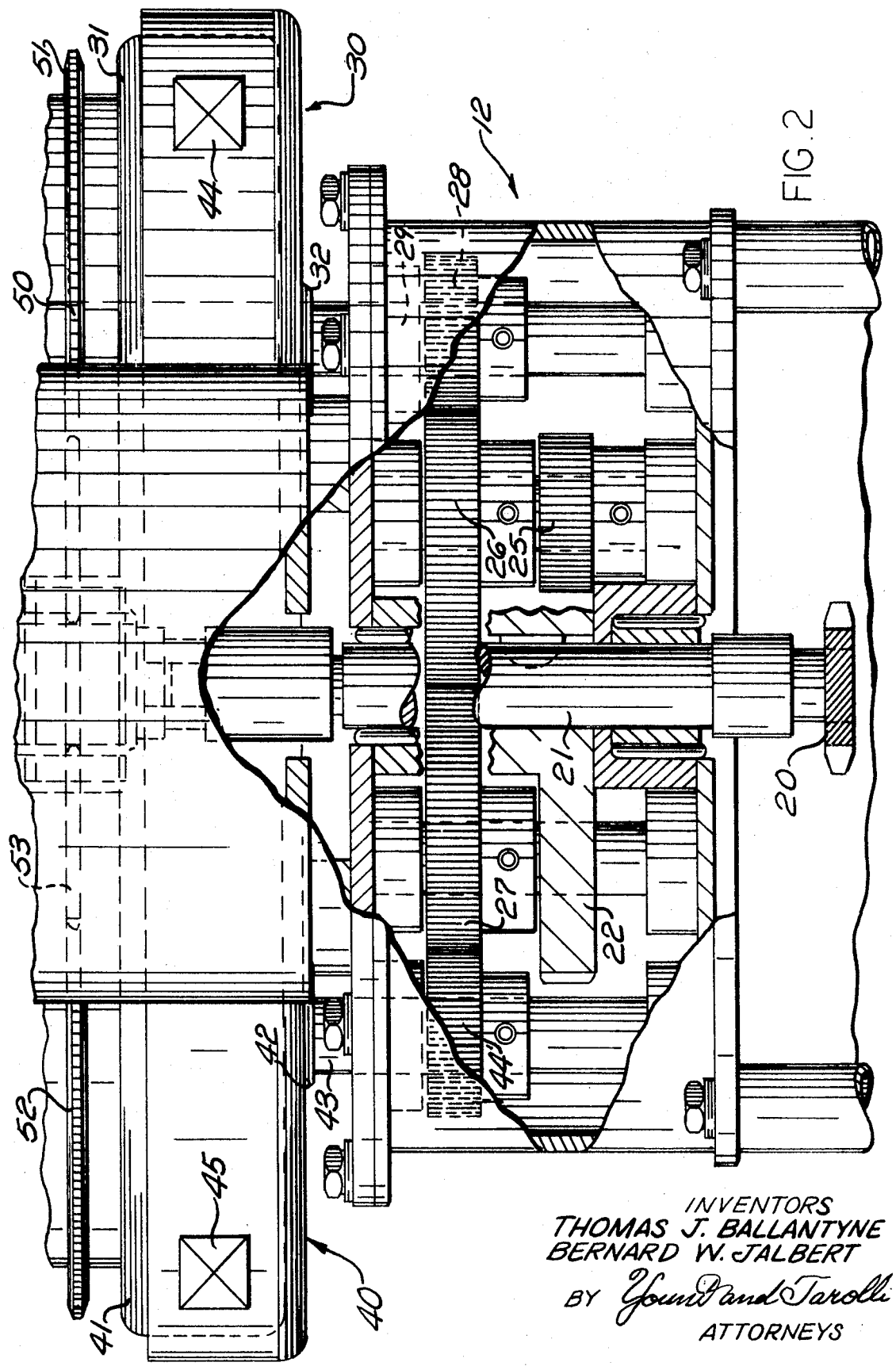
FIG. 2 is a fragmentary sectional view of a portion of the vehicle shown in FIG. 1 and illustrating a portion of the steering mechanism thereof.

The clutches 30, 40 are electromagnetic clutches of the eddy current type, which are well known. The clutches 30, 40 include electromagnetic coils 44, 45 which are shown schematically in FIG. 2 and in the circuit diagram, FIG. 4. As is well known, the torque-transmitting capability of these clutches depends upon the degree of excitation of the coils 44, 45. In view of the fact that the clutches are of conventional construction and also that the operation thereof are well known, further details of the clutches will not be described.

The input members 31, 41 of the clutches 30, 40 are driven from a common drive chain 50. The chain 50 is trained around a sprocket 51 which is drivingly connected with the input member 31 of the clutch 30 and with a similar sprocket 52 which is drivingly connected with the input member 41 of the clutch 40. The chain 50 is also trained around a sprocket 53 which comprises the output member of a suitable single direction DC motor. The DC motor effects rotation of the sprocket 53 in a clockwise direction, as viewed in FIG. 3.

Figure 3:
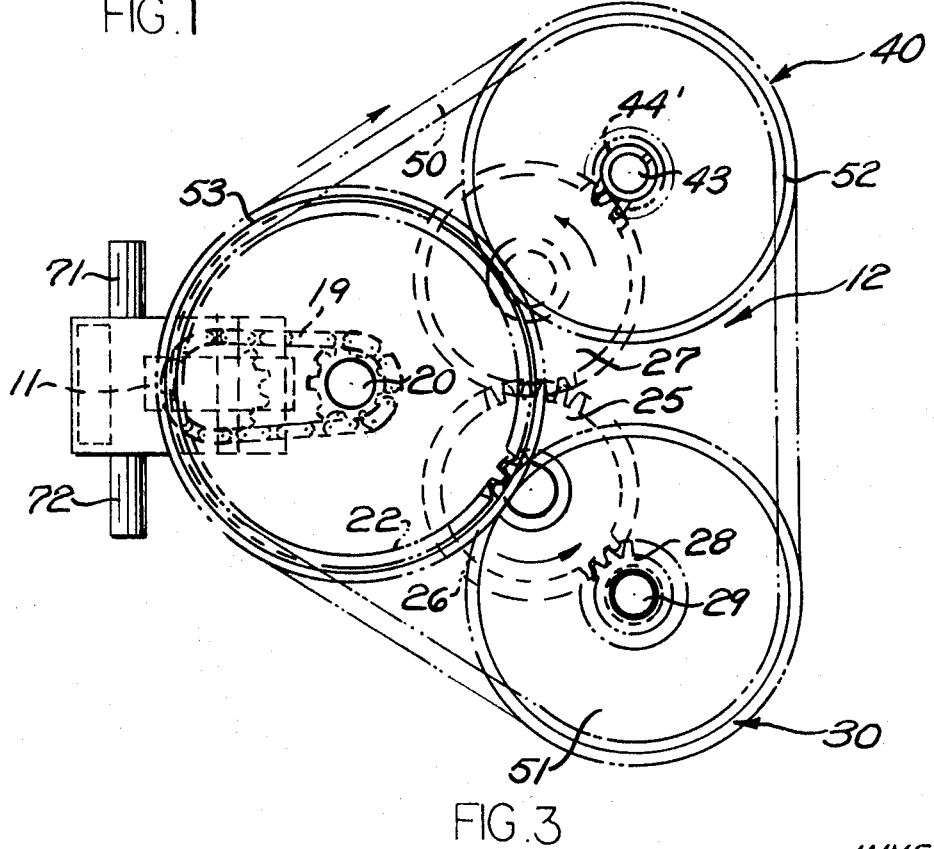
FIG. 3 is a top view of a portion of the steering mechanism incorporated in the vehicle of FIG. 1.

In view of the fact that the DC motor causes rotation of the sprocket 53 in a clockwise direction, as shown in FIG. 3, the chain 50 tends to move in the direction of the arrow, shown in FIG. 3. This, of course, results in a clockwise rotation of both sprockets 51, 52 and the input members 31, 41 of the clutches 30, 40, respectively, as viewed in FIG. 3. As a result, the output members of shafts 29, 43, respectively, and the gears 28, 44' associated therewith tend to rotate in a clockwise direction due to the operation of the clutches 30, 40.

In view of the fact that the gears 28, 44′, respectively, mesh with gears 26, 27, respectively, the gear 26 tends to rotate in a counterclockwise direction, as viewed in FIG. 3, and the gear 27 likewise tends to rotate in a counterclockwise direction. However, at the point of meshing engagement of the gears 26, 27, the gears are tending to rotate in opposite directions, as clearly viewed in FIG. 3, and thus drivingly oppose each other.

In view of the fact that the gears 26, 27 tend to rotate in opposite directions at their point of meshing engagement, there is no output movement of the gear 22 or, in turn, of the sprocket 20 as long as the driving torques applied by the gears 26, 27 to each other are equal. When these driving torques are equal, no relative rotation of the gears 26, 27 is effected. The driving torques applied to the gears 26, 27 are equal when the vehicle is being properly steered. Under normal conditions with the vehicle properly positioned, the clutch coils 44, 45 are energized to the same degree and, therefore, the driving torque applied to the output members 29, 43 will be equal. In view of the fact that the gears 28, 44 are of the same construction and that the gears 26, 27 are of the same construction, the driving torques applied by the gears 26, 27 to each other will be equal but opposed. As a result, no driving or rotational movement of the driven sprocket member 20 will be effected.

In the event, however, that energization of the clutch coils 44, 45 is varied so that they are not equally energized, the driving torque applied to the output members 29, 43 will be unequal. When those driving torques are unequal, the driving torque applied to the gears 28, 44′ will likewise be unequal, and thus the driving torques applied by the gears 26, 27 to each other will be unequal. Thus, the gears 26, 27 will rotate causing a driving of the driven steering member or sprocket 20 for steering purposes.

From the above, it should be apparent that steering of the vehicle can be effected by controlling the energization of the coils 44, 45. When the coils 44, 45 are equally energized, the wheel 11 remains in position. When the coils 44, 45 are unequally energized, the wheel 11 is moved and continues to move until the coils 44, 45 are again equally energized.

Figure 4:
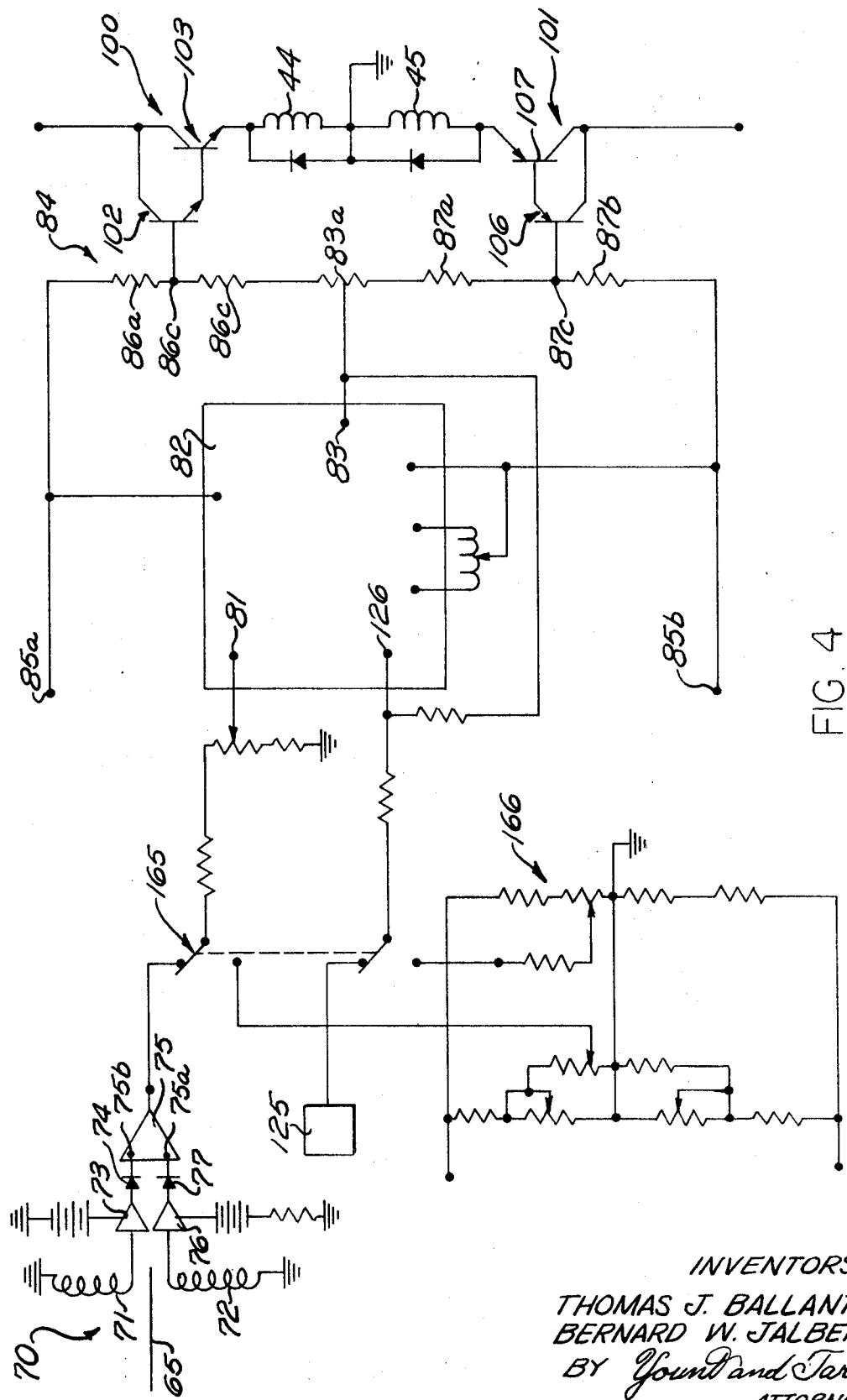
FIG. 4 is a circuit diagram illustrating the circuit used in connection with the steering mechanism illustrated in FIGS. 1 and 2 for effecting the control for steering of the vehicle of FIG. 1.

FIG. 4 illustrates a circuit for controlling the clutch coils 44, 45 of the clutches 30, 40, respectively, in order to effect steering of the vehicle in response to the vehicle moving off the desired path of travel. As illustrated in FIG. 4, a deviation sensor means 70 is mounted on the vehicle and senses the position of the vehicle relative to the wire 65 that the vehicle is to follow. The sensor means 70 comprises a pair of sensing coils 71, 72. The sensing coils 71, 72 are located in advance of the wheel 11, as best shown schematically in FIG. 1. The current-carrying wire 65, of course, has a magnetic field produced therearound by an alternating current flowing therein. The magnetic field induces a voltage in the coils providing a current therein which is applied to amplifiers 73, 76 for the coils 71, 72, respectively, and rectified by diodes 74, 77, respectively, and applied to the noninverting and inverting inputs 75a, 75b of a differential amplifier 75. When the coils 71, 72 are spaced equidistantly with respect to the wire 65, equal signals are induced therein and equal inputs are applied to the terminals 75a, 75b of the differential amplifier 75. The output of the differential amplifier under this condition may be referred to as zero output. If the coils 71, 72 are shifted so that the coil 71 is closer to the current carrying wire 65, the output from the amplifier 75 will increase in a positive-going direction from the zero output and if the coil 72 is closer, the output will increase but in a negative-going direction with respect to the zero output. It will be understood that the zero output could actually be a positive or negative level which is arbitrarily selected as the zero output for the differential amplifier.

The output of the differential amplifier is applied to a circuit 82 which may be termed a "comparison" circuit for comparing the output of the differential amplifier 75 with a fixed reference level to determine whether or not the output is at, above, or below its zero output.

The circuit 82 is a conventional circuit and has an output 83 which will increase or decrease as the signal from the differential amplifier 75 to the circuit 82 respectively increases from its zero output. The output 83 of the circuit 82 is connected to an adjustable tap 83a on a voltage dividing circuit 84 connected across a source of potential having positive and negative terminals 85a, 85b, respectively. The source of potential is a center tap source of potential with the center tap being ground so that the voltages at terminals 85a, 85b are respectively above and below ground by the same magnitudes. The terminal 85a is connected to the adjustable tap 83a on the voltage dividing network through series connected resistors 86a, 86b and the center tap 83a is connected to the negative terminal 85b through series connected resistors 87a, 87b.

As the voltage at the output 83 rises or falls in accordance with the deviation of the output signal from the differential amplifier 75 from zero output, the voltages at junctions 86c, 87c, between the resistors 86a, 86b, on one hand, and the resistors 87a, 87b, on the other hand, will change. If the voltage on output 83 increases, the potential at the tap 83a increases toward the potential of terminal 85a and the junction 86c will similarly increase in voltage, and the junction 87c will increase toward ground, i.e., become less negative. Similarly, a decrease in the voltage at the tap 83a will cause the voltage at the junction 87c to become more negative with respect to ground and the voltage at the junction 86c to decrease toward ground.

The voltages at the junctions 86c, 87c are used to control the flow of current to the clutch coils 44, 45, through Darlington amplifiers 100, 101. As the voltage of the junction 86c increases above ground and the voltage at 87c increases toward ground, the current to the coil 44 is increased and the current to the coil 45 decreased. Conversely, when the voltage of junction 86c decreases toward ground and the voltage 87c becomes increasingly negative, the current to the coil 45 increases and the current through the coil 44 decreases.

The Darlington amplifier 100 has the base of its control transistor 102, an NPN transistor, connected to the junction 86c and the Darlington amplifier 101 has the base of its control transistor 106 connected to the junction 87c. The Darlington amplifier 100 also includes an NPN load transistor 103. The load transistor 103 has its collector electrode connected to a source of positive potential and its emitter electrode connected to ground through the clutch coil 44.

The control transistor 106 of amplifier 101 is a PNP transistor and the PNP load transistor 107 thereof has its emitter connected to ground and its collector electrode connected to a source of potential which is negative with respect to ground.

It will be seen that as the potential of the tap 83a increases, the potential of junction 86c increases and the conductivity of the NPN transistor 103 is increased to increase the current flow through the coil 44. Simultaneously, the junction 87c becomes less negative relative to ground to decrease the current flow through coil 45. Conversely, if the potential of tap 83a decreases, the potential of junction 96c decreases toward ground and the conductivity of the amplifier 100 will decrease while simultaneously the junction 87c becomes increasingly negative with respect to ground to increase its conductivity. This will cause the current in coil 45 to increase and that in coil 44 to decrease.

Figure 5:
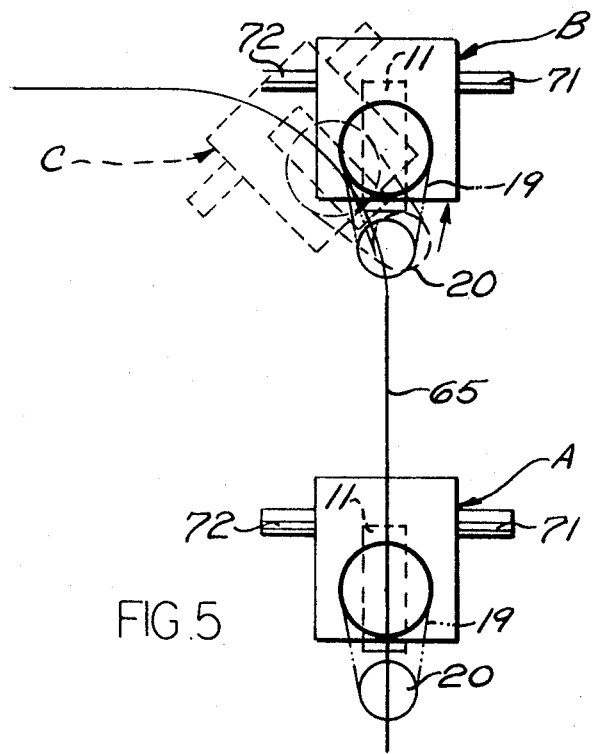
FIG. 5 is a schematic view showing an aspect of the operation of the present invention.

The operation of the circuit of FIG. 4 will be described in connection with FIG. 5. In position A of the vehicle, as shown in FIG. 5, the vehicle is on a straight portion of the wire 65 and the coils 71, 72 are spaced equal distances on opposite sides of the wire 65. As a result, equal signals are applied to the differential amplifier 75, and the output of the differential amplifier 75 is not effected thereby. In the event that the wire turns or is curved to the left, as illustrated in FIG. 5, the coil 72 will move toward the wire 65 as the vehicle tends to continue to move straight and the coil 71 will move away from the wire 65, such as shown in position B, FIG. 5. Accordingly, the signals on the plus and minus terminals 75b, 75a, respectively, of the differential amplifier 75 will be varied. In this case, the signal on the minus terminal 75a of the differential amplifier 75 will be increased and the signal on the plus terminal 75b will be decreased. As a result, the differential amplifier 75 applies to a minus signal to the circuit 82. The output or voltage at point 83a will accordingly be decreased. A decrease in voltage at point 83a causes a decrease in voltage at points 86c, 87c, as noted above. When the voltage at point 86c decreases, the current which flows through the clutch coil 44 decreases, and the current though clutch coil 45 increases, as described above.

Accordingly, in the situation where the coil 72 moves toward the wire 65, a lesser flow of current is provided through the coil 44 and a greater flow of current through the coil 45 is provided. As a result, the clutches 30, 40, respectively, are energized to a varying degree. The reduced flow of current through the coil 44 results in less torque being applied to gear 26 by the clutch 30. Thus, the gear 26 tends to be rotated in a counterclockwise direction, as viewed in FIG. 3, with less torque. The increased flow of current through the coil 45 causes the gear 27 to be rotated in a counterclockwise direction with a greater torque. Accordingly, the gear 27 overcomes the gear 26 and causes the gear 26 to rotate in a clockwise direction as viewed in FIG. 3. This rotation of the gear 26 in a clockwise direction causes a clockwise rotation of the gear 25 and a counterclockwise rotation of the gear 22, causing a counterclockwise rotation of the sprocket 20. A counterclockwise rotation of the sprocket 20 causes a pivoting of the steering wheel in the proper direction, as indicated by the arrow in FIG. 5, to effect turning of the vehicle back toward the wire 65.

In the event that the coil 71 moves closer to the wire 65 and the coil 72 moves away from the wire 65, a plus output signal is applied to the circuit 82 by the differential amplifier 75. This plus output will increase the voltage at points 83a, 86c and 87c in the circuit 84. An increase in voltage at point 86 causes an increase in the current flowing through the transistor 103 and, therefore, an increase in the current flowing through the clutch coil 44. An increase in voltage at point 87c causes a decrease in current flowing through the transistor 107 and, thus, causes a decrease in the current flowing through the clutch coil 45. With an increase in the current flowing through the clutch coil 44 and a decrease in the current flowing through the clutch coil 45, the torques applied to the gears 26, 27 will be varied. More specifically, the torque applied to the gear 26 urging the gear 26 in a counterclockwise direction will be increased, and the torque applied to the gear 27 urging the gear 27 in a counterclockwise direction will be decreased. Accordingly, the gear 26 will rotate in a counterclockwise direction, thereby effecting a clockwise rotation of the gear 22 and the sprocket 21, effecting a steering of the vehicle in a direction reverse to that described above when the coil 72 moved closer to the wire 65.

It should be apparent that as the vehicle moves or returns to a correct or centered position with respect to the wire 65, the degree of difference in the signals provided by coils 71, 72 lessens. As a result, the clutch coils 44, 45 tend to return to the condition in which the coils are energized to the same degree. In view of the fact that the sensing coils 71, 72 are located in advance of the wheel 11, the coils 71, 72 will return to the wire 65 and deviate in the other direction ahead of the wheel 11 to cause the wheel to apply a signal of opposite polarity to the circuit 82 to straighten the wheel as the vehicle returns to a centered position. This tends to minimize zigzag or movement of the vehicle along the wire, even though the illustrated system shows the wheel returned after turning in response to a reversal of the relative magnitude of the signals from coils 71, 72 when the vehicle returns toward a centered position on the wire.

The system described hereinabove is provided with a speed feedback signal by a tachometer generator 125. The tachometer generator 125 is driven from the output of one of the clutches and is illustrated as driven from the output member 29 of the clutch 30. As described hereinabove, the output member 29 of the clutch 30 is driven only when there is a steering error signal from the deviation sensor 70. The magnitude of that signal controls the degree to which the clutches 30, 40 are energized and thus control the speed at which the output member 29 rotates. The tachometer generator indicates the direction of speed and magnitude of speed of the output member 29. The tachometer generator signal is applied to the circuit 82 at an input terminal 126 thereof. The signal which is applied by the tachometer generator 120 to the terminal 126 may be termed a feedback signal, or alternatively may be termed a control signal which bucks or acts against the signal applied to the input terminal 81. As a result, the tachometer signal slows the speed of response of the wheel 11 and assists in providing a smooth return of the vehicle to a centered position.

It should be apparent, of course, that as the vehicle tends to return to a centered position relative to the current carrying wire 65, the signal from the deviation sensors 70 reduces, and as a result the coils 44, 45 are energized to less of a difference. Accordingly, the tachometer generator 125 is driven at a reduced, or a reducing speed, and the signal from the tachometer generator is reducing. As a result, as the vehicle tends to be centered with respect to the current carrying wire, the tachometer generator causes the steering to be effected in a smooth manner.

The clutches 44, 45 can be manually controlled to control vehicle steering with the automatic steering control deenergized. The control circuit illustrated in FIG. 4 deactivates the automatic control and places a manually controlled circuit 166 in condition for operation. The manual circuit 166 will not be described in detail, since its details do not form a part of the present invention.

Figure 6:
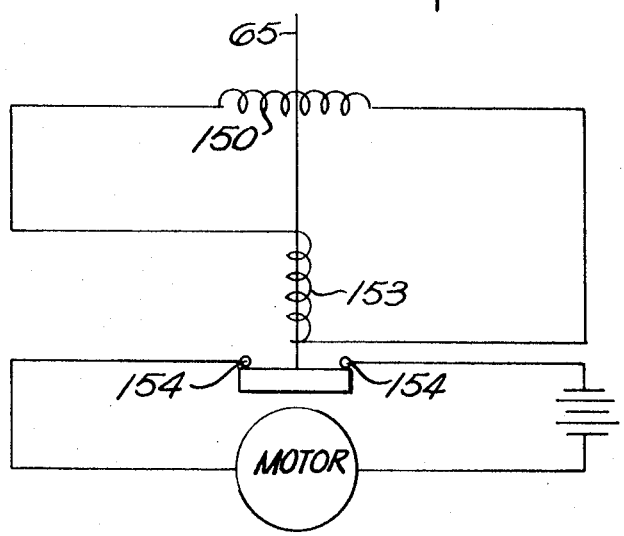
FIG. 6 is a schematic circuit diagram showing another feature of the present invention.

In addition to the steering control which is disclosed and described hereinabove, the vehicle 10 may be provided with a safety control for turning off the electric motor which drives the driving wheels of the vehicle in the event that the position of the vehicle for some reason becomes such that it is located too great a distance from the wire 65. In order to effect this control of the motor, a third coil 150, as shown schematically in FIG. 6, is provided and a voltage is induced across the coil 150 as the coil moves along the wire 65. The current which is induced in the coil as a result of its movement along the wire 65 controls a relay 153 having contacts 154 in the circuit for the motor for driving the wheel. In the event that the coil 150 becomes positioned too great an extent from the wire 65, the current flowing through the coil will be reduced to such an extent that the relay will be deenergized and the circuit to the motor will be opened, thus stopping the vehicle.

We claim:

1. A steering mechanism for causing a vehicle to follow a current-carrying wire comprising wheel means movable to effect vehicle steering, drive means for moving said wheel means for steering purposes, said drive means including a driven member, a pair of clutches having output members drivingly connected with said driven member and applying oppositely directed driving forces thereto, means constantly energizing said clutches to apply positive opposite and equal driving forces to said driven member when said vehicle is properly positioned relative to said wire, and sensor means for sensing deviation of said vehicle from said wire and operable in association with said energizing means to control said clutches in response thereto to change the driving torque applied to said driven member thereby and thereby effect rotation of said driven member to effect movement of said wheel means.

2. A steering mechanism as defined in claim 1 wherein said output members of said pair of clutches are drivingly connected with separate gears, said gears having torque applied thereto by said output members of said clutches tending to rotate said gears in opposition to each other, and one of said gears being drivingly connected with said driven member.

3. A steering mechanism as defined in claim 1 wherein said clutches comprise electromagnetic clutches having electrical coils the degree of energization of which controls the amount of torque transmitted to the output member of the clutch.

4. A steering mechanism as defined in claim 3 wherein said sensor means comprises a deviation sensor operatively associated with a control circuit, said circuit including said coils of said clutches and controlling the energization thereof.

5. A steering mechanism as defined in claim 4 wherein said circuit includes means for increasing the degree of energization of one of said coils while simultaneously decreasing the degree of energization of the other of said coils so as to effect movement of said driven member when the vehicle is not properly positioned relative to the wire.

6. A steering mechanism as defined in claim 4 wherein said circuit comprises a pair of transistors each of which is associated with one of said electromagnetic coils to control the degree of energization thereof.

7. A vehicle-steering mechanism as defined in claim 4 further including means responsive to rotation of said driven member for producing a speed feedback signal to said circuit means to effect a control on said circuit means.

8. A steering mechanism as defined in claim 7 wherein said means responsive to rotation of said input member comprises a tachometer and said circuit means includes circuit means to which said sensor means applies a signal and said tachometer applies a signal which opposes the signal by said sensor means and which circuit means controls said transistors.

9. A steering mechanism as defined in claim 1 wherein said vehicle has motor means for driving said vehicle and means for deenergizing said motor means to stop the vehicle when said sensor means moves a predetermined distance away from said wire.

10. A steering mechanism for causing a vehicle to follow a current-carrying wire comprising wheel means movable to effect vehicle steering, drive means for moving said wheel means for steering purposes, said drive means including a driven member, a pair of clutches having output members drivingly connected with said driven member and applying oppositely directed driving forces thereto, means constantly energizing said clutches to apply positive opposite and equal driving forces to said driven member when said vehicle is properly positioned relative to said wire, sensor means for sensing deviation of said vehicle from said wire, circuit means operable in association with said energizing means to control said clutches in response to said sensing means to change the driving torque applied to said driven member thereby and thereby effect rotation of said driven member to effect movement of said wheel means, and means responsive to rotation of said driven member for producing a speed feedback signal to said circuit means to effect a control on said circuit means.

11. A steering mechanism as defined in claim 10 wherein said output members of said pair of clutches are drivingly connected with separate gears, said gears having torque applied thereto by said output members of said clutches tending to rotate said gears in opposition to each other, and one of said gears being drivingly connected with said driven member.

12. A steering mechanism as defined in claim 11 wherein said clutches comprise electromagnetic clutches having electrical coils the degree of energization of which controls the amount of torque transmitted to the output member of the clutch 13. A steering mechanism as defined in claim 12 wherein said sensor means comprises a deviation sensor operatively associated with a control circuit, said circuit including said coils of said clutches and controlling the energization thereof, and means for increasing the degree of energization of one of said coils while simultaneously decreasing the degree of energization of the other of said coils so as to effect movement of said driven member when the vehicle is not properly positioned relative to the wire.